United States Patent
Lee (10) Patent No.: US 8,976,875 B2
(45) Date of Patent: Mar. 10, 2015

(54) CLOCK-EMBEDDED SOURCE SYNCHRONOUS SEMICONDUCTOR TRANSMITTING AND RECEIVING APPARATUS AND SEMICONDUCTOR SYSTEM INCLUDING SAME

(71) Applicant: Kyongsu Lee, Seongnam (KR)

(72) Inventor: Kyongsu Lee, Seongnam (KR)

( * ) Notice: Subject to any disclaimer, the term of this patent is extended or adjusted under 35 U.S.C. 154(b) by 0 days.

(21) Appl. No.: 14/360,044

(22) PCT Filed: Nov. 9, 2012

(86) PCT No.: PCT/KR2012/009438
§ 371 (c)(1),
(2) Date: May 22, 2014

(87) PCT Pub. No.: WO2013/077577
PCT Pub. Date: May 30, 2013

(65) Prior Publication Data
US 2014/0334583 A1  Nov. 13, 2014

(30) Foreign Application Priority Data

Nov. 24, 2011 (KR) .......................... 10-2011-0123670
Oct. 26, 2012 (KR) .......................... 10-2012-0119693

(51) Int. Cl.
*H04L 7/06* (2006.01)
*H04L 25/02* (2006.01)
(52) U.S. Cl.
CPC .............. *H04L 7/06* (2013.01); *H04L 25/0272* (2013.01)
USPC .......................................................... 375/257
(58) Field of Classification Search
CPC ........................................................ H04L 7/06
USPC .................. 375/299, 257, 354, 316
See application file for complete search history.

(56) References Cited

U.S. PATENT DOCUMENTS 8,767,841 B1 * 7/2014 Li et al. .......................... 375/257
2011/0293041 A1 * 12/2011 Luo et al. ....................... 375/316

(Continued)

FOREIGN PATENT DOCUMENTS

| JP | 2007-155611 A | 6/2007 |
| KR | 10-2007-0024195 A | 3/2007 |

(Continued)

OTHER PUBLICATIONS

"A 5 Gbps 0.13 um CMOS Pilot-Based Clock and Data Recovery Scheme for High-Speed Links," Mahmound Reza Ahmadi et al., IEEE Journal of Soild-State Circuits, vol. 45, No. 8, Aug. 2010, pp. 1533-1541.

(Continued)

*Primary Examiner* — Jaison Joseph
(74) *Attorney, Agent, or Firm* — Patent Office of Dr. Chung Park (57) ABSTRACT

The present invention relates to a clock-embedded or source synchronous semiconductor transmitting and receiving apparatus and to a semiconductor system including same. The semiconductor apparatus according to one embodiment of the present invention includes: a data providing unit for providing differential data; a multi-phase clock generator for generating a first clock signal provided to the data providing unit, and a second clock signal having a different phase from the first clock signal; and a combining unit for receiving the differential data and the second clock signal and combining same to generate a combined signal, wherein the second clock signal is a single clock signal and has n (here, n is an integer of two or greater) times a symbol period of the differential data, the first and second clock signals have a 90 degree phase difference, and the combination signal is transmitted to the outside through differential transmission lines.

29 Claims, 8 Drawing Sheets

(56) References Cited

U.S. PATENT DOCUMENTS

2012/0087452 A1* 4/2012 Zerbe et al. .................. 375/354
2012/0140853 A1* 6/2012 Terauchi ...................... 375/299

FOREIGN PATENT DOCUMENTS

| KR | 10-2008-0066327 A | 7/2008 |
| KR | 10-0942976 B1 | 2/2010 |
| KR | 10-0948415 B1 | 3/2010 |

OTHER PUBLICATIONS

"A 5 Gb/s Link with Matched Source Synchronous and Common-Mode Clocking Techniques," Jared Zerbe et al., IEEE Journal of Solid-State Circuits, vol., 46, No. 4, Apr. 2011, pp. 974-985.

"Half-Rate Clock-Embedded Source Synchronous Transceivers in 130-nm CMOS," Kyongsu Lee et al., IEEE Transactions on Very Large Scale Integration (VLSI) Systems, pp. 1-10, 2013.

* cited by examiner

CLOCK-EMBEDDED SOURCE SYNCHRONOUS SEMICONDUCTOR TRANSMITTING AND RECEIVING APPARATUS AND SEMICONDUCTOR SYSTEM INCLUDING SAME

CROSS-REFERENCE TO PRIOR APPLICATIONS

This application is a national Stage Patent Application of PCT International Patent Application No. PCT/KR2012/009438, filed on Nov. 9, 2012 under 35 U.S.C. §371, which claims priority of Korean Patent Application Nos. 10-2011-0123670, filed on Nov. 24, 2011 and 10-2012-0119693, filed on Oct. 26, 2012, which are all hereby incorporated by reference in their entirety.

TECHNICAL FIELD

The present invention relates to a semiconductor transmission/reception apparatus and a semiconductor system including the same and, more particularly, to a semiconductor transmission/reception apparatus for the transmission of data between a semiconductor device and a system using clock-embedded source synchronous signaling and a semiconductor system including the same.

BACKGROUND ART

As the amount of data transmitted between semiconductor chips and the transfer rate of the data are increased, the area and power occupied by a transmission/reception unit within the semiconductor chip continue to be increased. As research related to a semiconductor device, active research is being carried out in order to increase efficiency of circuits.

During the data transmission, an error attributable to a data loss during transmission may be minimized only when the data is transmitted at a specific time interval and a reception unit recovers the data at the same time interval. To this end, the clock signal of a specific frequency is required, and information about the clock signal of the specific frequency is transmitted from a transmission unit to the reception unit so that the data may be recovered correctly. A current data transmission method between semiconductor chips often includes a clock-forwarded signaling method and a clock-embedded signaling method. The former is a method of directly providing a clock signal for recovery to the reception unit using a separate pin for sending the clock signal in addition to a pin for data transmission, and is widely used in a method of transmitting and receiving a large amount of data between a semiconductor memory chip and a CPU which requires multiple data transmission/reception channels. This method is also known as source-synchronous signaling, meaning that synchronization is achieved by directly sending a clock signal. The latter is a method of extracting, by the reception unit, information about the transition of a transmitted differential data signal itself, recovering a clock signal in itself, and using the recovered clock for data recovery. A Clock and Data Recovery (CDR) circuit is used for such a function.

As data transmission/reception rate between semiconductor chips increases, an increase of a Bit Error Rate (BER) attributable to noise on the power lines that is present inside and outside the chips becomes an important issue. Such noise results in jitter noise by which the transition time of a data signal is changed. A symbol period indicative of the period of one bit of data is gradually reduced as the data transfer rate is increased, and the influence of jitter noise is gradually increased along with high speediness. As a result, the jitter noise functions as an important factor that limits maximum data transfer rate. If such jitter noise differently affects the data signal and the clock signal on the path along which data synchronized with the clock signal at the transmitter is transferred to the reception unit through a communication channel, a cross correlation between the data and the recovery clock signal at the end of the channel is deteriorated when the reception unit recovers the data from the clock signal, leading to an increase of the BER. In order to prevent such a BER increment, if the path along which the data is transmitted is matched with the path along which the clock signal is transmitted to the utmost so that noise influence due to the power supply lines affects the same jitter noise in the data signal and the recovery clock signal, a low BER may be maintained during recovering data at the receiver even in the presence of power noise.

In high-speed data transmission/reception between semiconductor chips, the two methods (clock-forwarded signaling and clock-embedded signaling) have advantages and disadvantages. In the former case, there often exists a difference between the transmission/reception paths of the data signal and the clock signal, and a difference of time delay on the paths attributable to parasitic capacitance and resistance components associated with a difference in the routing topology of the lines of the signals. Such a phenomenon results in a great path difference especially when recovering the data from multiple transmission/reception channels using a single clock signal. This path difference is generated when distributing the clock signal to multiple data transmission/reception circuits. Furthermore, a difference in the routing topology of a medium conductor (or a transmission channel) that connects semiconductor chips on the outside of the semiconductor chips, that is, on a PCB makes this method as a disadvantageous method in high-speed signal transmission/reception because it often causes a difference in the path between data and the clock signal.

Meanwhile, the latter case is a method that is historically used to send and receive data to and from a long distance using a transmission cable. In this method, in order to prevent great expenses from occurring in adding a transmission cable for a separate clock signal in addition to data cable to a long distance, when a transmission unit sends a differential data signal to two pins, a reception unit (or CDR in this case) recovers the clock signal from information by which a received digital data shifts from 0 to 1 or from 1 to 0 and uses the recovered clock signal for data recovery. Such a method is widely applied to semiconductor circuits as the transfer rate between semiconductor chips is recently increased. In this case, however, a CDR circuit itself is complicated, and the fast varying jitter noise of a data signal that is affected by rapidly changing power noise is not sufficiently rapidly incorporated into the clock signal due to the time delay of the CDR circuit itself. Accordingly, such a method functions as a factor to increase the BER in high-speed data transmission/reception. Furthermore, such a method is disadvantageous in that it deteriorates power efficiency because the CDR circuit needs to operate continuously while data is transmitted.

DISCLOSURE

Technical Problem

The present invention has been made to resolve the problems of the existing transmission/reception method between semiconductor chips, and an object of the present invention is to provide a semiconductor transmission/reception apparatus using embedded source synchronous signaling, wherein a clock signal is combined with a differential data signal and transmitted, and a reception unit separates the clock signal and the differential data signal with ease and uses the signals for data recovery, thereby being capable of decreasing BER by minimizing a path difference occurring between the transmission and reception of data and a clock signal, that is, a problem in the existing clock-forwarded signaling method, and being capable of increasing power efficiency and reducing a load of the area of a transmission/reception circuit by removing a load of a complicated CDR circuit compared to the clock-embedded signaling method, and a semiconductor system including the same.

A semiconductor device in accordance with an embodiment of the present invention includes a data providing unit for providing differential data, a multi-phase clock generation unit for generating a first clock signal provided to the data providing unit and a second clock signal having a different phase from the first clock signal, and a signal combination unit for receiving the differential data and the second clock signal and generating a combination signal by combining the differential data and the second clock signal, wherein the second clock signal is a single clock signal and has n times a symbol period of the differential data (n is an integer of 2 or more), the first clock signal and the second clock signal has a difference in phases of 90 degrees, the second clock signal is combined with the differential data in common, the combination signal is a differential signal and has a cross-point voltage level, the cross-point voltage level varies depending on a level of the second clock signal, and the combination signal is externally transmitted through differential transmission lines.

Meanwhile, a semiconductor system in accordance with an embodiment of the present invention includes a first semiconductor device for receiving differential reception signals through differential transmission lines, wherein the first semiconductor device includes a differential equalizer for amplifying high frequency bands of the differential reception signals and outputting the amplified signals as differential signals, a differential data recovery unit for recovering differential data from the differential reception signals by detecting a difference between the differential signals having the amplified high frequency bands, a differential clock recovery unit for extracting a common mode signal by adding the differential signals having the amplified high frequency bands, recovering a single clock signal from the differential signals having the amplified high frequency bands, and generating differential clock signals having a specific phase difference from the differential data by converting the recovered single clock signal into the differential clock signals, a data sampling unit for sampling the differential data using the differential data and the differential clock signals.

TRANSLATION OF DRAWINGS

Figure 1:
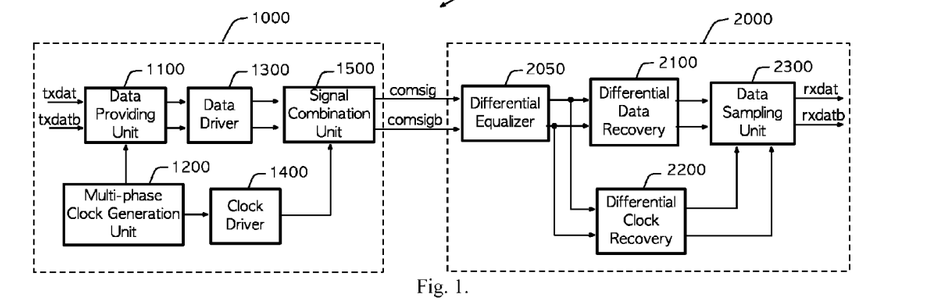
FIG. 1 is a block diagram illustrating an example of a semiconductor system and a semiconductor device in accordance with an embodiment of the present invention.

FIG. 1
1100: Data providing unit
1200: Multi-phase clock generation unit
1300: Data driver
1400: Clock driver
1500: Signal combination unit
2050: Differential equalizer
2100: Differential data recovery unit
2200: Differential clock recovery unit
2300: Data sampling unit
FIG. 13
7100: Differential data recovery unit
7200: Differential clock recovery unit
7300: Data sampling unit

BEST MODE

The accompanying drawing and contents described in the drawings that illustrate preferred embodiments of the present invention need to be referred in order to fully understand the present invention, advantages in the operation of the present invention, and the object achieved by the implementation of the present invention.

Hereinafter, the present invention is described in detail by describing the preferred embodiments of the present invention in detail with reference to the accompanying drawings.

The same reference numerals suggested in each drawing denote the same elements.

FIG. 1 is a block diagram illustrating an example of a semiconductor system and a semiconductor device in accordance with an embodiment of the present invention. As illustrated in FIG. 1, the semiconductor system 100 in accordance with an embodiment of the present invention includes a first semiconductor device 1000 for the transmission of signals and a second semiconductor device 2000 for the reception of signals. A transmission channel for the transmission/reception of signals is disposed between the first semiconductor device 1000 and the second semiconductor device 2000. Each of the first semiconductor device 1000 and the second semiconductor device 2000 may be implemented using a semiconductor chip, a semiconductor package, etc. Furthermore, the first semiconductor device 1000 has been illustrated as being a transmission chip for sending signals and the second semiconductor device 2000 has been illustrated as being a reception chip for receiving signals, but each of the semiconductor devices may include both an element for sending signals and an element for receiving signals. In such a case, for example, the first semiconductor device 1000 may further include elements included in the second semiconductor device 2000 in addition to elements included in the first semiconductor device 1000.

In order to overcome the limit of the existing clock-forwarded signaling method, the first semiconductor device 1000 combines a clock signal with differential signal data and sends the combined signal to the second semiconductor device 2000 through differential transmission lines. That is, when the differential data and the clock signal are combined by the final stage of the transmission stage and transmitted, a difference in the path between the differential data and the clock signal may be removed, and a difference in a differential data recovery path and the recovery path of the clock signal even in a reception stage is minimized, so a structure advantageous for high-speed transmission is achieved.

As illustrated in FIG. 1, the first semiconductor device 1000 includes a data providing unit 1100, a multi-phase clock generation unit 1200, a data driver 1300, a clock driver 1400, and a signal combination unit 1500. The data driving unit 1100 receives differential data generated by the first semiconductor device 1000 and outputs the differential data in synchronism with a specific clock. For example, the differential data txdat and txdatb is generated by the first semiconductor device 1000 and is provided to the data driving unit 1100. The data driving unit 1100 provides the differential data txdat and txdatb to the data driver 1300 in response to at least one clock signal from the multi-phase clock generation unit 1200. The data driver 1300 receives the differential data txdat and txdatb, and performs a driving operation so that the received differential data txdat and txdatb has driving power that sends the received differential data txdat and txdatb through the differential transmission lines.

Meanwhile, the multi-phase clock generation unit 1200 generates at least two clock signals having different phases. At least one of the generated clock signals is provided to the data driving unit 1100, thus controlling timing at which the differential data txdat and txdatb is provided. Furthermore, at least the other of the generated clock signals is provided to the clock driver 1400. The clock driver 1400 performs a driving operation on the received clock signal, and provides the clock signal to the signal combiner 1500. The signal combiner 1500 combines and outputs the received differential data txdat and txdatb and the clock signal. For example, the signal combiner 1500 may combine the differential data txdat and txdatb and the clock signal using a method of adding the differential data txdat and txdatb and the clock signal.

The data driving unit 1100 outputs the differential data txdat and txdatb in a specific symbol period. Furthermore, the multi-phase clock generation unit 1200 generates two or more clock signals having a cycle that is n times (n is an integer of 2 or more) the symbol period of the differential data txdat and txdatb. For example, assuming that at least one clock signal provided to the data driving unit 1100 is a first clock signal and at least one clock signal provided to the clock driver 1400 is a second clock signal, the first clock signal and the second clock signal have a specific phase difference. The first clock signal and the second clock signal preferably have a period of 2 times the symbol period of the differential data txdat and txdatb, and the first clock signal and the second clock signal may have a phase difference of 90 degrees.

Accordingly, the signal combiner 1500 combines the differential data txdat and txdatb and the second clock signal having a phase difference of 90 degrees from the differential data txdat and txdatb, and outputs combination signals comsig and comsigb through the differential transmission lines.

Meanwhile, as illustrated in FIG. 1, the second semiconductor device 2000 receives the combination signals comsig and comsigb through the differential transmission lines, and recovers the differential data and the clock signal from the differential combination signals having amplified high frequency bands. To this end, the second semiconductor device 2000 may include a differential equalizer 2050, a differential data recovery unit 2100, a differential clock recovery unit 2200, and a data sampling unit 2300.

The combination signals comsig and comsigb transmitted through the differential transmission lines are converted into the differential signals having amplified high frequency band through the differential equalizer 2050, and are provided to the differential data recovery unit 2100 and the differential clock recovery unit 2200, respectively. In order to compensate for a signal loss of high frequency bands of the differential combination signals transmitted by the transmission stage that is generated because the differential combination signals pass through a transmission channel having a narrow frequency band, the differential equalizer 2050 receives the received differential combination signals comsig and comsigb as inputs and provides the differential combination signals having amplified frequency bands to the differential data recovery unit 2100 and the differential clock recovery unit 2200, respectively. The differential data recovery unit 2100 performs a processing operation on the differential combination signals having amplified frequency bands, and extracts the differential data from the differential combination signals. Furthermore, the differential clock recovery unit 2200 performs a processing operation on the differential combination signals having amplified frequency bands, and extracts differential clock signals from the differential combination signals. In accordance with an embodiment of the present invention, in extracting the differential clock signals from the differential combination signals having amplified frequency bands, a process of extracting a single clock signal by performing a first processing operation on the differential combination signals having amplified frequency bands and extracting the differential clock signals by performing a second processing operation on the single clock signal is included.

Meanwhile, the extracted differential data and the differential clock signals are provided to the data sampling unit 2300. The data sampling unit 2300 outputs the differential data in synchronism with the differential clock signals. The outputs of the data sampling unit 2300 are reception data rxdat and rxdatb, and are transferred to the inside of the second semiconductor device 2000.

A detailed implementation example and operation of the semiconductor system and the semiconductor devices of the present invention that may be implemented as described above are described with reference to FIG. 2.

Figure 2:
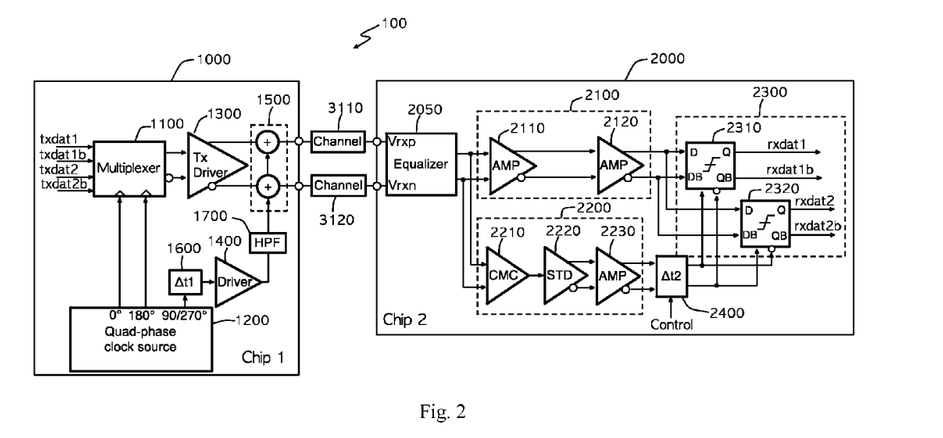
FIG. 2 is a block diagram illustrating one implementation example of the semiconductor system and the semiconductor device of FIG. 1.

FIG. 2 is a block diagram illustrating one implementation example of the semiconductor system and the semiconductor device of FIG. 1. As illustrated in FIG. 2, the data driving unit 1100 may be implemented to include a multiplexer. For example, the multiplexer may be a 2:1 multiplexer. The data providing unit 1100 receives the differential data, multiplexes the received differential data, and outputs the multiplexed data. For example, two differential data txdat1, txdat1b and txdat2, txdat2b are provided to the data providing unit 1100, and at least single clock signal is provided from the multi-phase clock generation unit 1200 to the data providing unit 1100. The multi-phase clock generation unit 1200 may be implemented using a quad-phase clock source for generating four different phase signals. For example, first clock signals having phases of 0 degree and 180 degrees are provided to the data providing unit 1100.

The data providing unit 1100 outputs the differential data txdat1, txdat1b, txdat2, txdat2b in synchronism with the first clock signals. For example, the first differential data txdat1 and txdat1b are output in synchronism with the first clock signal having a phase of 0 degree, and the second differential data txdat2 and txdat2b are output in synchronism with the first clock signal having a phase of 180 degrees. Accordingly, the data providing unit 1100 outputs the output of the differential data at a twice data transfer rate. Furthermore, the symbol period of the differential data output by the data providing unit 1100 has a relation that is ½ of the period of the clock signal.

The output of the data providing unit 1100 is applied to the data driver 1300, and is transferred to the differential transmission channel outside the first semiconductor device 1000 through the signal combination unit 1500. Meanwhile, at least one second clock signal from the multi-phase clock generation unit 1200 is provided to the signal combination unit 1500 via a specific delay unit 1600 and the clock driver 1400. The second clock signal is a single clock signal, and may have a phase difference of 90 degrees compared to the first clock signals that are provided to the data providing unit 1100 and that have a phase of 0 degree and a phase of 180 degrees. For example, at least one of single-clock signals having a phase of 90 degrees and a phase of 270 degrees compared to the first clock signals is provided to the signal combination unit 1500 via the clock driver 1400 as the second clock signal. FIG. 2 illustrates an example in which the second clock signals having a phase of 90 degrees and a phase of 270 degrees are provided to the clock driver 1400, but only a single clock signal having a phase of 90 or 270 degrees may be provided to the clock driver 1400 as the second clock signal.

Meanwhile, although not illustrated in FIG. 1, the delay unit 1600 and a filter (e.g., a High Pass Filter (HPF)) 1700 may be further included in the first semiconductor device 1000. That is, in order to compensate for the difference in the phases of the differential data and the second clock signal, the delay unit 1600 for delaying the input signal based on the same delay time as delay between the clock and the output in the data providing unit 1100 that may be implemented using a 2:1 multiplexer, etc. is included. The second clock signal is provided to the clock driver 1400 via the delay unit 1600, and the outputs of the clock driver 1400 are combined with the differential data at the final stage of the transmission unit, respectively. The signal combination unit 1500 may include one or more adders for adding the signals, and the differential data and the clock signal are added in the final stage via the same delay time path. The delay unit 1600 has been illustrated as being disposed in order to delay the second clock signal, but the delay unit 1600 may be disposed in order to delay the differential data.

Furthermore, the filter 1700 may be further disposed to amplify the high frequency component of the output of the clock driver 1400. When the filter 1700 is disposed, interference with the differential data of a low frequency band can be reduced when the signals are combined. Furthermore, there is an advantage in that the clock frequency of the second clock signal is amplified. Accordingly, there are advantages in that voltage of a recovered clock signal can be increased and jitter can be reduced on conditions that the same power is used.

Figure 3:
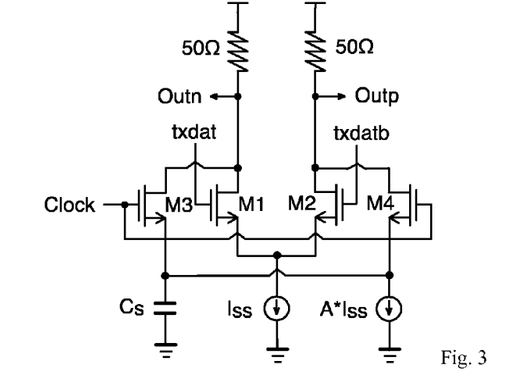
FIG. 3 is a circuit diagram illustrating an example in which a data driver, a clock driver, a signal combination unit, and a filter of FIG. 2 are implemented.

FIG. 3 is a circuit diagram illustrating an example in which the data driver 1300, the clock driver 1400, the signal combination unit 1500, and the filter 1700 of FIG. 2 are implemented. For convenience of description, an example in which the differential data txdat and txdatb from the data providing unit 1100 is provided to the data driver 1300 is illustrated.

The differential data txdat and txdatb is applied to the input terminals of the data driver 1300 formed of MOS transistors M1 and M2, respectively, and the second clock signals are applied to the input terminals of the clock driver 1400 formed of MOS transistors M3 and M4, respectively. The outputs of the data driver 1300 and the outputs of the clock driver 1400 are coupled. In this case, current sources for supplying constant currents to the respective driving units are separated, and each may have a relative current ratio A. As a single zero and a single pole are added to the frequency characteristics of the clock driver 1400, capacitance Cs connected in parallel to the current source part of the clock driver 1400 forms the filter (e.g., the HPF) 1700. There is an advantage in that power consumption and a jitter component are further reduced because a clock driving constant current source can be reduced by the disposition of the filter 1700.

Figure 4:
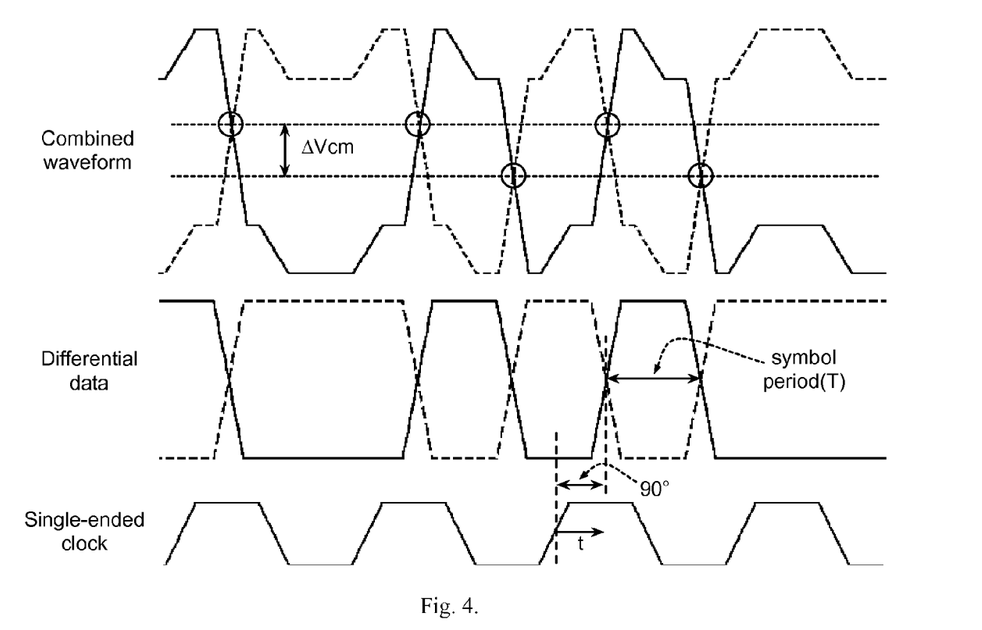
FIG. 4 is a timing diagram illustrating an example of a signal transmitted by the semiconductor system of FIG. 2 through a transmission channel.

A process of adding the clock signal to the differential data signal in the final stage of the transmission unit is described below with reference to FIG. 4. In this case, it is assumed that the clock signal added to the differential data signal has a period that is two times the symbol period of the differential data. FIG. 4 is a timing diagram illustrating an example of the signal transmitted by the semiconductor system of FIG. 2 through the transmission channel.

First, the clock signal (i.e., a single-ended clock) is a single clock signal having a phase difference of 90 degrees from a point of time at which the differential data shifts. The clock signal is delayed by half the symbol period of the differential data signal (i.e., a phase difference of 90 degrees on the basis of the clock frequency), and is combined with the differential data. In this case, a time delay difference from an optimum point of time at which the clock signal shifts may be defined as t. The t value may have a positive value or a negative value.

The cross-point voltage of the combined signal forms two voltage levels depending on whether the differential data signal shifts when the clock signal is a high level or whether the differential data signal shifts when the clock signal is a low level as in FIG. 4. Meanwhile, the combined clock signal has voltage slightly smaller than the data signal. When the combined output signal passes through a circuit or communication channel having a limited bandwidth, Data-Dependent Jitter (DDJ) that varies depending on the pattern of the data signal is generated. The reason for this is that when the clock signal shifts, DDJ is generated by the influence of the direction in which the data signal near data varies. The amount of jitter increases as the absolute value of the t value increases and the transition time becomes long. Since voltage of the clock signal is small compared to the data signal, the generated jitter is concentrated on a recovered clock signal. As a result, the most optimum signal can be recovered when the difference in the transition times of the differential data and the clock signal is a phase of 90 degrees on the basis of the clock frequency.

Figure 5:
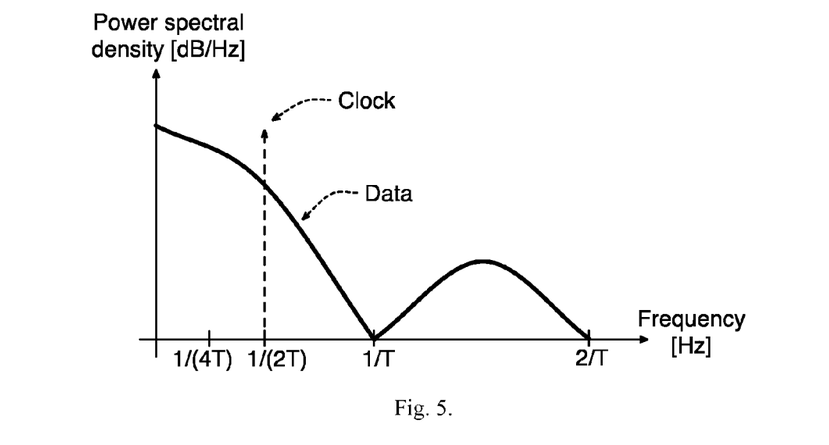
FIG. 5 is a diagram illustrating an example of a frequency spectrum of the output of a transmission stage assuming that the symbol period of differential data is T.

In general, in a digital data transmission method, the symbol period of data is defined as a minimum time unit that represents digital data of 1 or 0. Assuming that the symbol period of differential data is T, a reciprocal number thereof is a symbol transfer rate. When the period of the clock signal added to the differential data as described above is twice the symbol period of the differential data, the output data of the transmission stage and the frequency spectrum of the clock are illustrated in FIG. 5. That is, the frequency of the added clock signal is placed at ½ of the symbol transfer rate 1/T. In general, the equalizer of the reception stage that is used to selectively amplify only a high frequency band in order to compensate for a loss attributable to the limited bandwidth of the transmission channel functions to selectively amplify a frequency band that is about ½ of the symbol transfer rate. In such a case, the clock signal having a clock period that is twice the symbol period of the differential data can be recovered by sharing the amplification frequency band of the differential equalizer 2050. Meanwhile, if the difference between the frequency of a clock to be recovered and the amplification frequency band of the equalizer is great, for example, if the period of the clock signal is four times the symbol period of the differential data (i.e., a point 1/(4T) of FIG. 5), the differential equalizer may be included in the differential data recovery unit 2100, and a common mode signal converter (CMC) for extracting and amplifying only a clock signal may be placed in the differential clock recovery unit 2200 so that the differential equalizer and the CMC have respective amplification frequency bands.

Meanwhile, in order to recover the differential data from signals (hereinafter referred to as differential reception signals) received through differential transmission lines 3110 and 3120, the second semiconductor device 2000 includes the differential equalizer 2050 for amplifying the high frequency bands of the differential reception signals, the differential data recovery unit 2100 for recovering the differential data from the differential signals having amplified high frequencies, the differential clock recovery unit 2200 for recovering the differential clock signals from the differential signals having amplified high frequencies, and the data sampling unit 2300 for sampling the differential data using the recovered differential clock signals. The second semiconductor device 2000 may further include a delay circuit 2400 for delaying the recovered differential clock signals by a specific time t2 and outputting the delayed signals.

Figure 6:
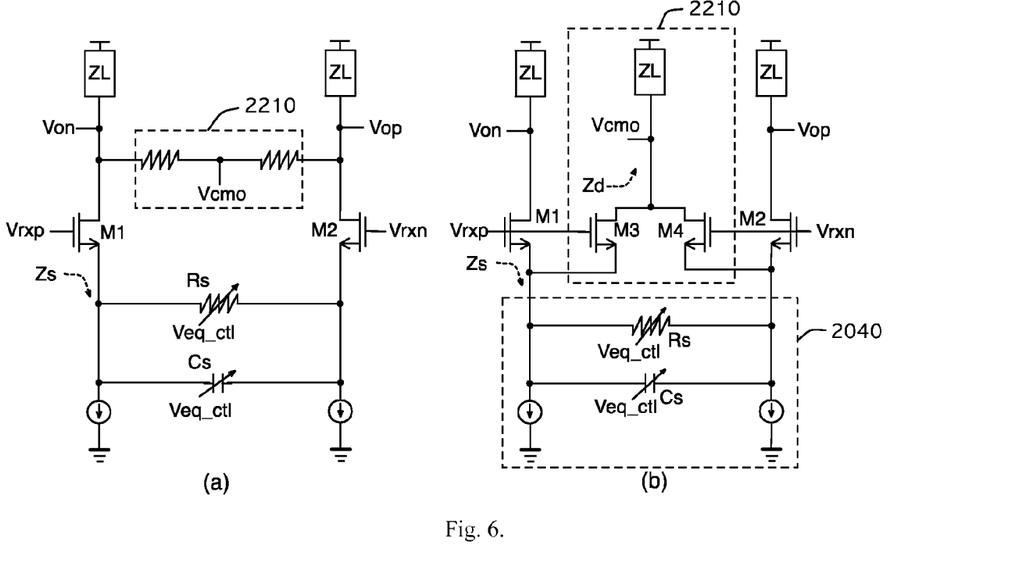
FIG. 6 is an example in which a differential equalizer including a common mode signal converter is implemented, and is a circuit diagram illustrating two types of methods of implementing the common mode signal converter.

Meanwhile, in order to compensate for a signal loss of a high frequency band attributable to the narrow frequency bandwidth of the communication channel between the transmission stage and the reception stage, the differential equalizer 2050 functions to amplify specific high frequency bands of the received differential combination signals by a specific amplification load so that a signal margin when data is sampled. FIG. 6 is an implementation example of a differential analog equalizer. A source-degenerative differential amplification circuit is used, and the load of an output terminal ZL may be formed of a resistor or an LC-tank circuit. In this case, a frequency band to be amplified and the degree of amplification are determined by the frequency characteristics of equivalent impedance Zs that is seen toward the ground from the source terminal of M1/M2 for the frequency characteristics of the given output terminal ZL. More specifically, the frequency band and the degree of amplification are determined by controlling an Rs value and a Cs value. To this end, in a common implementation example, one or a plurality of control terminals Veq_ctl is used. The outputs of the equalizer 2050 provide the combination signals having amplified high frequency bands to the differential data recovery unit 2100 and the differential clock recovery unit 2200.

The differential data recovery unit 2100 may include one or more differential amplifiers (AMPs) 2110 and 2120 for calculating the difference between the combination signals and recovering the differential data. Each of the amplifiers 2110 and 2120 may be implemented using a differential AMP for receiving a differential input and generating a differential output by amplifying the received differential input. Furthermore, the differential clock recovery unit 2200 may include the CMC 2210 for calculating the sum of the combination signals, a single-to-differential signal converter (hereinafter referred to as an STD circuit) 2220, and a differential AMP 2230. The CMC is also called a common mode signal amplifier (CMS).

As illustrated in FIG. 2, the differential data recovery unit 2100 uses one or a plurality of the amplifiers 2110 and 2120 in order to extract only the differential data from the output signals whose high frequency bands have been amplified, of the differential equalizer, and amplify the extracted differential data, and provides the output to the data sampling unit 2300. The data sampling unit 2300 may include one or more sampling circuits (or sampling flip-flops) 2310 and 2320. In this case, the clock signals included in the differential combination signals having amplified high frequency bands are considered to be common mode signals and are removed by the differential AMPs 2110 and 2120.

In order to recover the clock signals from the differential combination signals having amplified high frequency bands, the CMC 2210 may be used. The CMC 2210 is the reciprocal of a differential AMP concept, and is a circuit that functions to extract or amplify common mode signals and attenuate the differential signals by combining the differential combination signals. FIGS. 6(*a*) and 6(*b*) are examples in which the CMC 2210 is implemented. As in FIG. 6(*a*), the CMC 2210 may include a resistance distribution circuit for performing the function. Alternatively, in order to amplify the common mode signals (the degree of amplification >1), the CMC 2210 may use amplification circuits M3 and M4 that are separate and that use the received differential signals as their inputs, as in FIG. 6(*b*). In this case, the degree of amplification of the common mode signal may be defined as $Avcm=-gm*Zd(1+gm*Zs)$. The gm denotes the transconductance ($gm=gm3=gm4$) of the transistor M3/M4, and Zd or Zs is indicative of equivalent impedance at a stage that sees the output load ZL or equivalent impedance that sees the ground from the source terminal thereof. The output load ZL may be implemented using a simple resistor, but may be implemented using an LC-resonance structure or an inductive-peaking structure using inductance in order to improve the degree of amplification and accuracy.

In the CMC 2210 illustrated in FIG. 6(*b*), the differential reception signals are received to the inputs of the separate amplifiers M3 and M4, the common mode signals are extracted and amplified through addition, and the recovered single clock signal is output. The CMC 2210 may be different from the case of FIG. 6(*a*) in which the output of the differential equalizer is received as its input. That is, in the case of FIG. 6(*b*), part of the Band Pass Filter (BPF) function of the differential equalizer is shared by the common mode amplification circuit, and the equivalent impedance (Zs, 2040) circuit of the source terminal of the amplifier in FIG. 6(b) is the subject of sharing. There is an advantage in that power consumption attributable to the separated common mode amplifier stage 2210 of FIG. 2 can be reduced because part of the differential equalizer and the common mode amplification circuit is shared as described above.

Figure 7:
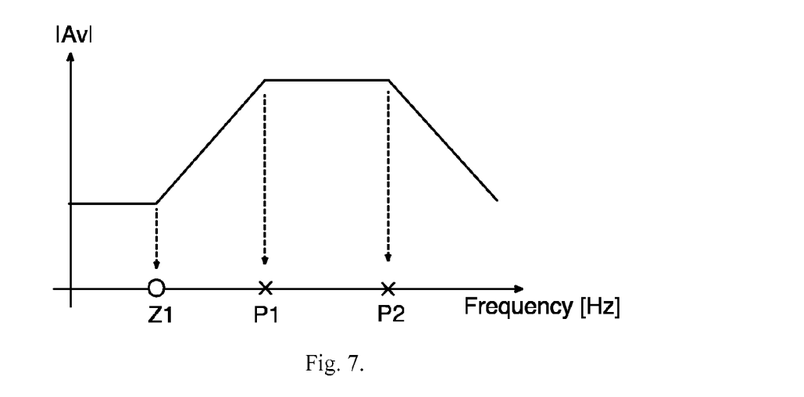
FIG. 7 is a diagram illustrating frequency characteristics between the input and output of the differential equalizer of FIG. 6.

FIG. 7 is a diagram illustrating frequency characteristics between the input and output of the differential equalizer 2050 of FIG. 6. A frequency, when being analyzed, has the characteristic of a BPF having one zero z1 and two poles p1 and p2. In this case, the location of the zero z1 is determined by Rs and Cs of the source terminal, which is represented as 1/(Rs*Cs). The first pole p1 may be represented as (1+gm*Rs/2)/(Rs*Cs). The second pole p2 is a pole determined by the output terminal ZL. If the output terminal ZL is connected in parallel to the resistor RL and the capacitance CL, the location of the output terminal ZL may be represented as 1/(RL*CL).

In the case of FIG. 6(b), the differential equalizer 2050 and the CMC 2210 share the Zs circuit, that is, equivalent impedance that is seen from the source terminal of the differential equalizer toward the ground. Accordingly, the frequency characteristics of the differential equalizer and the CMC may have a characteristic in which the locations of the zero z1 and the first pole p1 of FIG. 7 are shared. In this case, transconductance (gm) of the first pole p1 has the value of each separated amplifier. That is, gm=gm1=gm2 in the case of the differential equalizer, and gm=gm3=gm4 in the case of the CMC. The location of the second pole p2 may be individually defined depending on ZL of each of the differential equalizer and the CMC.

Figure 8:
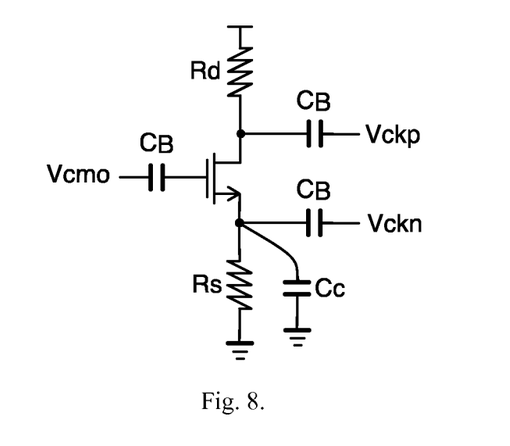
FIG. 8 is a circuit diagram illustrating an example in which a single differential conversion (STD) circuit for a clock signal of FIG. 2 is implemented.

Meanwhile, the single clock signal is recovered by the CMC 2210 of FIG. 2, and the recovered single clock signal is provided to the input of the STD circuit 2220. The STD circuit 2220 converts the single clock signal into the differential clock signals. For example, a circuit having a common-source common-drain (CS-CD) structure as illustrated in FIG. 8 may be used as the STD circuit 2220. In order to increase the degree of amplification, the STD circuit 2220 may be implemented using an active BALUN circuit that is widely used in an RF circuit. In this case, the STD circuit 2220 may also include a circuit for correcting the phase offset of the recovered differential clock signals. A capacitor Cc illustrated in FIG. 8 may become an example of the circuit for correcting the phase offset of the recovered differential clock signals.

The differential clock signals recovered as described above are amplified through the differential AMP 2230 and are provided to the delay circuit 2400. The difference may occur between the delay time of the data recovery path and the path delay time of the clock recovery circuit. The delay circuit 2400 performs a delay operation on the differential clock signals by the delay time difference, and provides the output thereof to the data sampling unit 2300.

The data sampling unit 2300 may include one or more sampling circuits. For example, as illustrated in FIG. 2, the data sampling unit 2300 may include the first and the second sampling circuits 2310 and 2320. The differential data from the differential data recovery unit 2100 is provided to the respective input terminals of the first and the second sampling circuits 2310 and 2320. Furthermore, the differential clock signals from the differential clock recovery unit 2100 are provided to the respective clock stages of the first and the second sampling circuits 2310 and 2320. The first and the second sampling circuits 2310 and 2320 sample the differential data using the differential clock signals having opposite phases. Accordingly, the symbol period of the differential data signal output by the data sampling unit 2300 has the same value as the period of the differential clock signals. The outputs rxdat1, rxdat1b and rxdat2, rxdat2b of the data sampling unit 2300 are reception differential data, and are provided to the second semiconductor device 2000.

MODE FOR INVENTION

Figure 9:
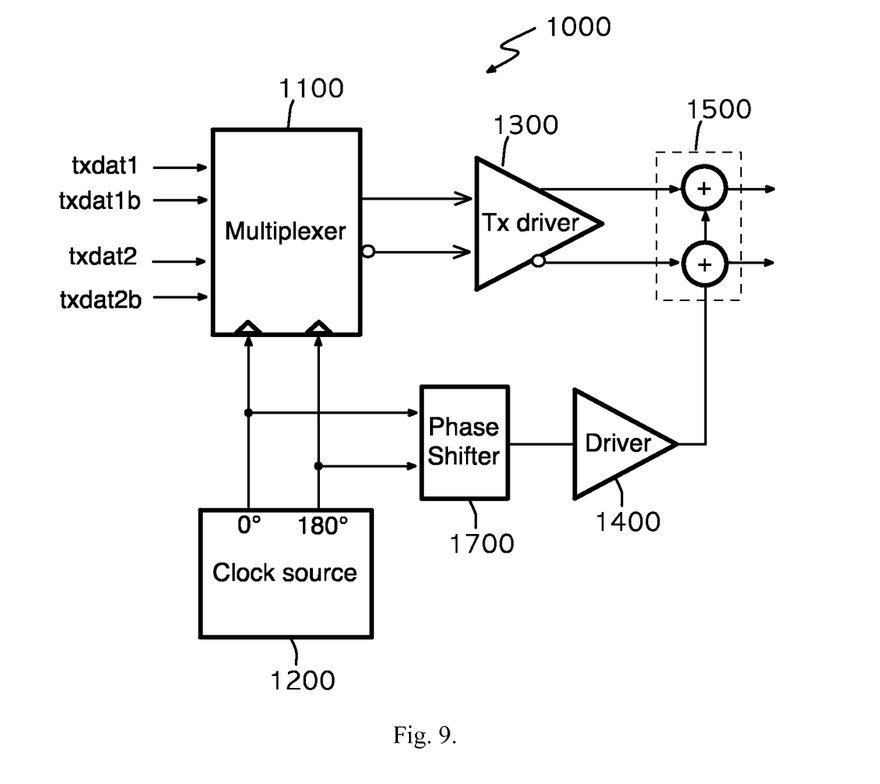
FIG. 9 is a block diagram illustrating an example of a semiconductor device in accordance with another embodiment of the present invention.

FIG. 9 is a block diagram illustrating an example of a semiconductor device in accordance with another embodiment of the present invention. FIG. 9 illustrates one implementation example of the first semiconductor device 1000 for sending differential data.

As illustrated in FIG. 9, the first semiconductor device 1000 may include a multiplexer 1100, that is, a data providing unit, a clock source 1200, that is, a clock generation unit, a data driver 1300, a clock driver 1400, and a phase shifter 1700. The multiplexer 1100, the data driver 1300 and the clock driver 1400 have the same construction as those of FIG. 1 and operate like those of FIG. 1, and a detailed description thereof is omitted.

The clock source 1200 may generate only a single clock signal, or may generate two single-clock signals having opposite phases. For example, two single clock signals having phases of 0 degree and 180 degrees are generated and provided to the multiplexer 1100. Differential data, that is, the output of the data driver 1300, is provided to a signal combination unit 1500.

Meanwhile, the single clock signal is provided to the phase shifter 1700, and the phase shifter 1700 controls the phase of the received single clock signal and provides the resulting clock signal to the signal combination unit 1500 via the clock driver 1400. The phase shifter 1700 receives the same clock signal as the single clock signal provided to the multiplexer 1100, controls the phase of the received clock signal, and outputs the resulting signal. The phase shifter 1700 is disposed in order to determine the phase of the single clock signal to be combined with the differential data. Preferably, the phase shifter 1700 controls the phase of the single clock signal, provided by the clock source 1200, 90 degrees and outputs the resulting signal. Accordingly, the signal combination unit 1500 generates a combination signal having a waveform, such as that illustrated in FIG. 4, by combining the differential data and the single clock signal whose phase has been controlled 90 degrees.

Figure 10:
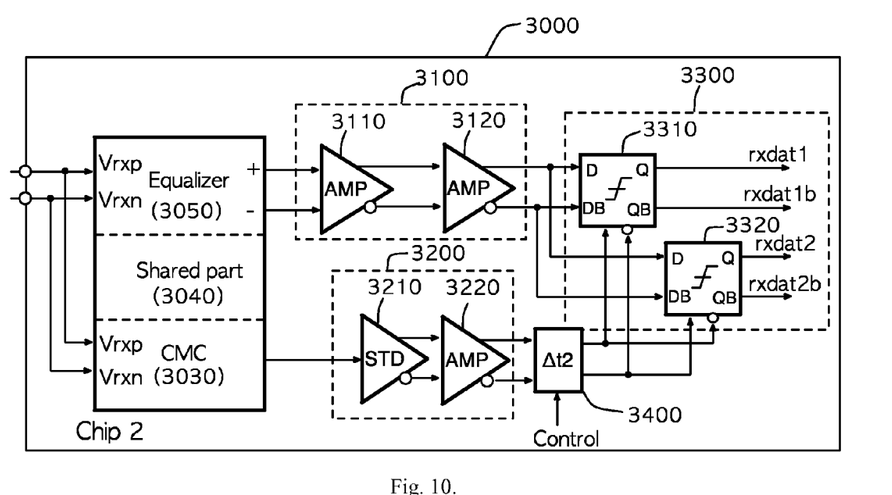
FIG. 10 is a block diagram illustrating an example of a semiconductor device in the case where a common mode signal converter that shares part of a differential equalizer circuit as in FIG. 6(b) is used.

FIG. 10 is a block diagram illustrating an example of a semiconductor device in the case where a CMC that shares part of a differential equalizer circuit as in FIG. 6(b) is used. FIG. 10 illustrates an example of a second semiconductor device 3000 in the case where some of the functions of the differential equalizer is shared with the CMC as in FIG. 6(b).

In FIG. 10, received differential signals are applied to the respective inputs of a differential equalizer 3050 and a CMC 3030. In this construction, the differential equalizer 3050 and the CMC 3030 have a shared part 3040, thereby being capable of reducing power consumption. The output of a differential signal of the differential equalizer 3050 is applied to a data recovery unit 3100. The output of a single clock recovered by the CMC 3030 is applied to the STD circuit 3210 of a differential clock recovery unit 3200, and is converted into a differential clock signal. In such a case, the differential clock recovery unit 3200 of FIG. 10 may be formed of the STD 3210 and a differential AMP 3220.

Figure 11:
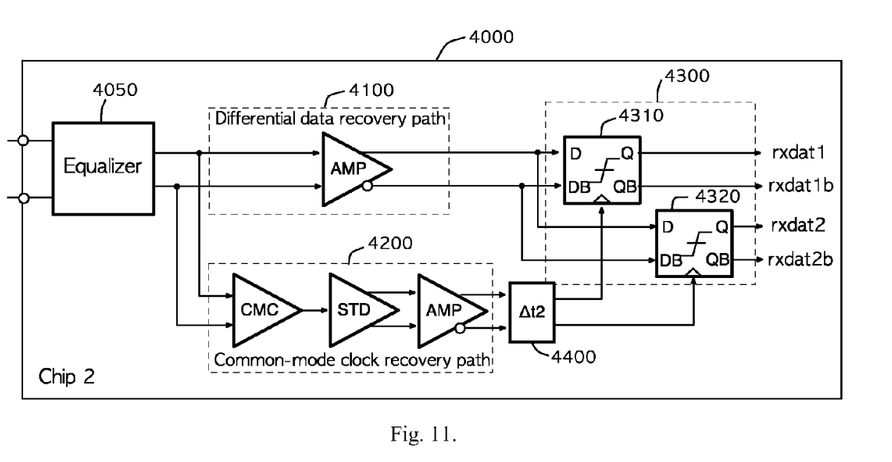
FIG. 11 is a block diagram illustrating an example of a semiconductor device in accordance with yet another embodiment of the present invention.

FIG. 11 is a block diagram illustrating an example of a semiconductor device in accordance with yet another embodiment of the present invention. More specifically, FIG. 11 illustrates an example of a second semiconductor device 4000 for amplifying a high frequency band and recovering differential data and differential clock signals using differential reception signals.

FIG. 11 illustrates an example in which a data sampling operation is performed using a sampling circuit having a single clock input, that is, another embodiment of a second semiconductor device 4000. Differential data output by a data recovery circuit 4100 is provided to the differential input terminals of sampling circuits of a data sampling unit 4300, whereas differential clock signals output through a clock recovery circuit 4200 and a delay circuit 4400 are provided to the respective single clock terminals of the sampling circuits. For example, one of the differential clock signals is provided to the single clock terminal of a first sampling circuit 4310, and the other of the differential clock signals is provided to the single clock terminal of a second sampling circuit 4320. Since the differential clock signals have the difference in the phase of 180 degrees, the first and the second sampling circuits 4310 and 4320 alternately sample the differential data. Accordingly, the symbol periods of differential reception data rxdat1, rxdat1b and rxdat2, rxdat2b have the same value as the period of the differential clock signal.

Figure 12:
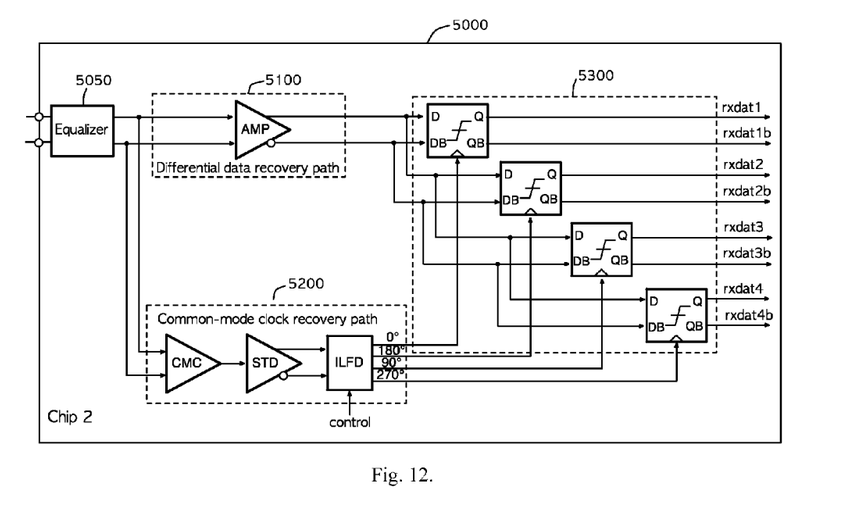
FIG. 12 is a block diagram illustrating one implementation example of a semiconductor system in accordance with yet another embodiment of the present invention.

FIG. 12 is a block diagram illustrating one implementation example of a semiconductor system in accordance with yet another embodiment of the present invention. More specifically, FIG. 12 illustrates an example of a second semiconductor device 5000 for recovering differential data and differential clock signals using differential reception signals.

A clock recovery circuit 5200 includes an Injection-Locked Frequency Divider (ILFD) circuit. An STD circuit applies the outputs of recovered differential clock signals to the ILFD circuit, so a frequency is divided into ½ and at the same time four phase signals are generated. For optimum data sampling, a control signal capable of controlling the delay time of an output phase may be provided to the ILFD circuit. The control signal changes the self-resonant frequency of the ILFD circuit, and functions to change the output phase from the difference between the self-resonant frequency and an input frequency. Although not illustrated in FIG. 11, the clock recovery circuit 5200 may be implemented using a phase delay circuit and a common frequency divider circuit instead of the ILFD circuit.

Meanwhile, twice sampling circuits are required for data recovery because the frequency of a clock signal for sampling is reduced by half, and clock signals applied to the twice sampling circuits have the difference in the phase of 90 degrees that is the same as the period of the clock signal. As illustrated in FIG. 11, a data sampling unit 5300 may include four sampling circuits. An optimum sampling phase may be obtained through training in the initial stages of driving. In this case, a widely known method of scanning the entire controllable range and searching for an optimum condition may be introduced. In this case, an optimum phase condition is a point of time at which the setup time and hold time of a sampler can be most secured. The symbol periods of recovery data rxdat1, rxdat1b, rxdat2, rxdat2b, rxdat3, rxdat3b, and rxdat4, rxdat4b output by the data sampling unit 5300 have the same value as the period of the supplied clock signal.

Figure 13:
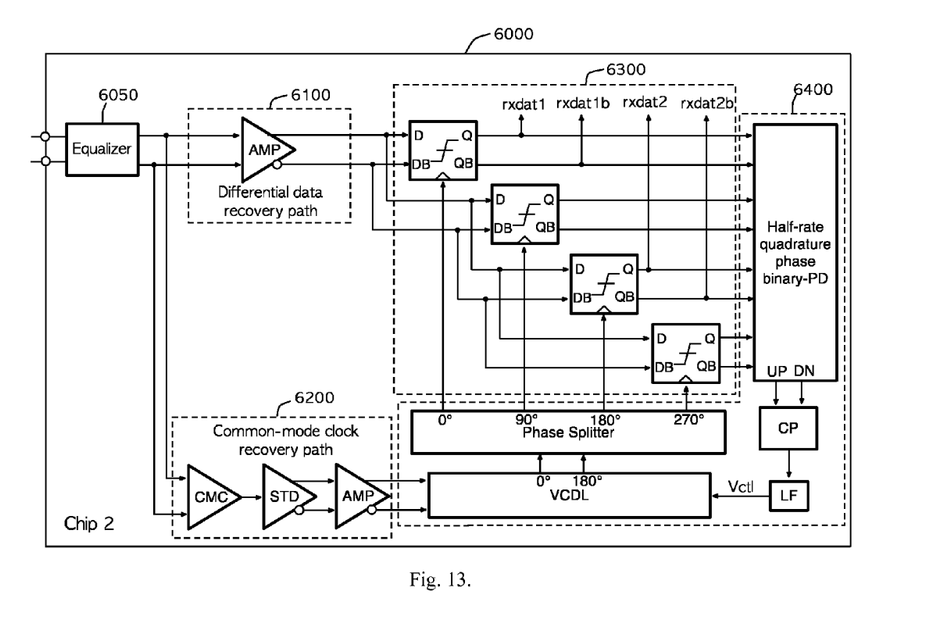
FIG. 13 is a block diagram illustrating one implementation example of a semiconductor system in accordance with yet another embodiment of the present invention.

FIG. 13 is a block diagram illustrating one implementation example of a semiconductor system in accordance with yet another embodiment of the present invention. More specifically, FIG. 13 illustrates an example of a second semiconductor device 6000 for recovering differential data and differential clock signals using differential reception signals. Furthermore, FIG. 13 illustrates an embodiment in which the front stage of a reception unit has been applied to an existing CDR structure.

As illustrated in FIG. 13, the second semiconductor device 6000 may further include a clock phase control unit 6400 in addition to a data recovery circuit 6100, a clock recovery circuit 6200, and a data sampling unit 6300. The data recovery circuit 6100 recovers differential data from differential reception signals. The clock recovery circuit 6200 recovers clock signals from the differential reception signals and converts the clock signals into differential clock signals. The converted differential clock signals are subject to a specific amplification operation, and are provided to the clock phase control unit 6400.

The differential clock signals are converted into four clock signals through a Voltage-Controlled Delay Line circuit (hereinafter referred to as a VCDL circuit) and a phase splitter. The four clock signals are provided to the respective single clock terminals of sampling circuits of the data sampling unit 6300. The data sampling unit 6300 samples and outputs differential data rxdat1, rxdat1b, rxdat2, and rxdat2b in synchronism with the four clock signals, respectively. Furthermore, the sampled differential data rxdat1, rxdat1b, rxdat2, and rxdat2b are provided to the VCDL circuit via the phase detector PD, the charge pump CP, and the loop filter LF of the clock phase control unit 6400. For example, a half-rate 4 phase detector may be used as the phase detector PD, and an existing phase interpolator structure or poly-phase filter structure may be used as the phase splitter. The VCDL circuit controls the phases of the differential clock signals as much as the phases of the differential data rxdat1, rxdat1b, rxdat2, and rxdat2b have shifted so that the difference in the phases according to signal processing between the data recovery circuit 6100 and the clock recovery circuit 6200 is compensated for.

Figure 14:
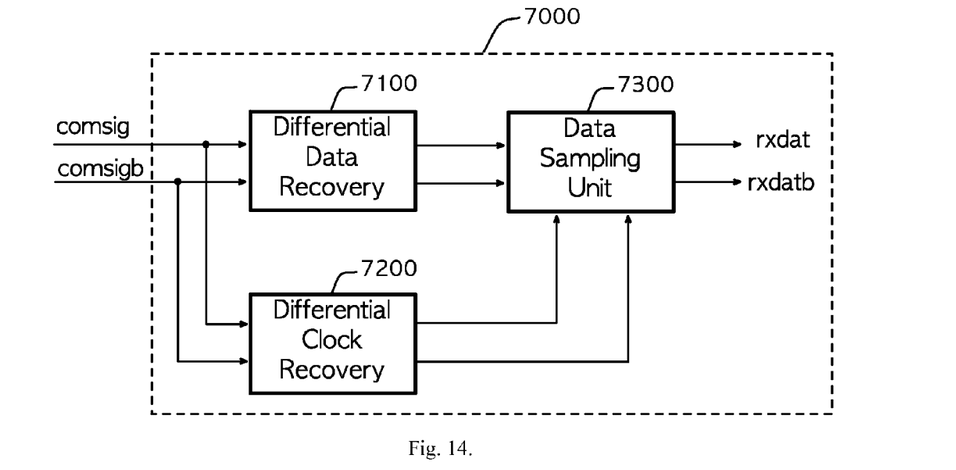
FIG. 14 is a block diagram illustrating one implementation example of a semiconductor system in accordance with yet another embodiment of the present invention.

FIG. 14 illustrates yet another embodiment of the second semiconductor device of FIG. 1.

The second semiconductor device 7000 includes a differential data recovery unit 7100 for recovering differential data from differential reception signals, a differential clock recovery unit 7200 for recovering differential clock signals from the differential reception signals, and a data sampling unit 7300 for sampling differential data using the recovered differential clock signals. In this case, the differential equalizer of FIG. 1 may be included in the differential data recovery unit.

Figure 15:
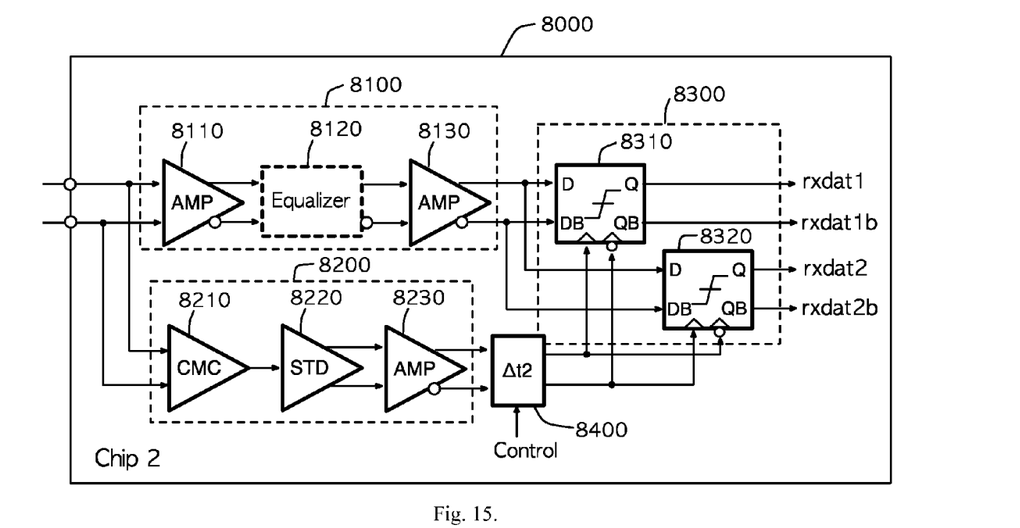
FIG. 15 is a block diagram illustrating one implementation example of the semiconductor system and the semiconductor device of FIG. 14.

Meanwhile, FIG. 15 is a detailed implementation example of FIG. 14. A differential data recovery unit 8100 uses one or a plurality of AMPs 8110 and 8130 in order to extract only differential data from differential reception signals and amplify the differential data, and provides the output to a data sampling unit 8300. The data sampling unit 8300 may include one or more sampling circuits (or sampling flip-flops) 8310 and 8320. In this case, in the differential data recovery process, clock signals included in the differential reception signals are considered to be common mode signals and are removed by differential AMPs 8110 and 8130. Furthermore, with the purpose of amplifying the high frequency bands of the received differential signals, a differential equalizer 8120 may be included in the differential data recovery path. The differential equalizer 8120 is denotes for increasing a margin when sampling data by amplifying the high frequency component of a reception signal reduced due to a bandwidth limited by a communication channel. The differential equalizer 8120 may use a source-degenerative circuit as in FIG. 6 (in this case, the CMC 2210 is excluded). A resistor load or an LC-tank load may be disposed at the output terminal of the source-degenerative circuit. The differential equalizer 8120 may be placed at the front of data recovery or right before the data sampling unit 8300, if necessary.

Figure 16:
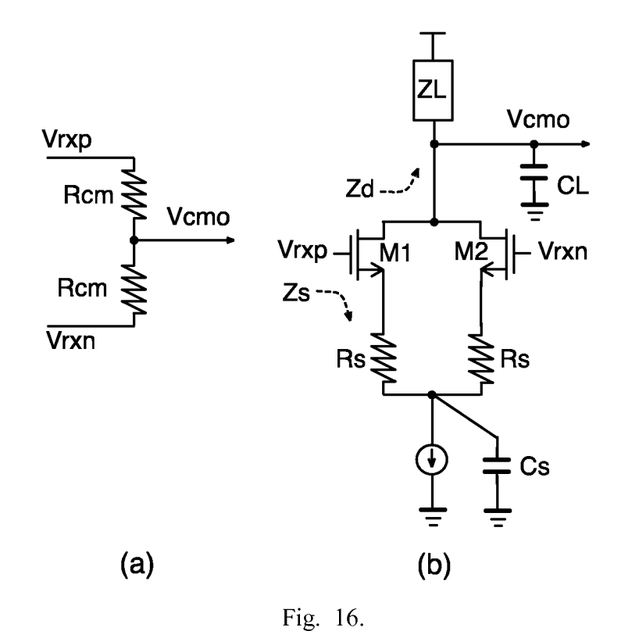
FIG. 16 is a circuit diagram illustrating two implementation examples of a common mode signal converter of FIG. 15.

A differential clock recovery unit 8200 for recovering differential clock signals from the differential reception signals may include a CMC 8210, an STD circuit 8220, and a differential AMP 8230. The CMC 8210 is the reciprocal of a differential AMP concept, and is a circuit that functions to amplify a common mode signal by combining the received differential signals and attenuate the differential signals. FIGS. 16(*a*) and 16(*b*) are examples in which the CMC 8210 has been implemented. As in FIG. 16 (*a*), the CMC 8210 may include a resistance distribution circuit and perform the function. Alternatively, in order to amplify the common mode signal, the CMC 8210 may use an amplification circuit as in FIG. 16 (*b*). In this case, the degree of amplification of the common mode signal may be defined as $Avcm = -gm*Zd(1+gm*Zs)$. The gm denotes the same transconductance of transistors M1/M2, and Zd or Zs denotes equivalent impedance at a stage that sees an output load ZL or equivalent impedance at a stage that sees source resistors Rs. The output load ZL may be implemented using a simple resistor, but may be implemented using an LC-resonance structure or inductive-peaking structure using inductance in order to improve the degree of amplification and accuracy.

Meanwhile, the embodiment of FIG. 2 may be likewise applied to a detailed implementation example of the STD circuit 8220, the differential AMP 8230, the delay circuit 8400, and the sampling unit 8300, and various embodiments (FIG. 11~FIG. 13) of the sampling unit may be likewise applied.

The present invention has been described with reference to the embodiments illustrated in the drawings, but the embodiments are only illustrative. Those skilled in the art to which the present invention pertains will understand that various modifications and other equivalent embodiments are possible. Accordingly, the true technical scope of the invention should be determined by the following claims.

INDUSTRIAL APPLICABILITY

The present invention can replace an existing transmission/reception circuit using then clock-forwarded signaling method and the clock-embedded signaling method, which performs a high-speed data transmission/reception function between semiconductor chips and devices using a PCB line (trace) and a transmission cable between the semiconductor chips as a medium, and can reduce a load of a semiconductor area and power attributable to the addition of a pin for additional clock transmission and a CDR circuit, that is, a disadvantage of the existing method, and can very easily maintain a cross correlation between a clock and data compared to the existing method in an environment in which broadband noise is present. In particular, the present invention can be advantageously applied to high-speed data transmission.

The invention claimed is:

1. A semiconductor device, comprising:
a data providing unit for providing differential data;
a multi-phase clock generation unit for generating a first clock signal provided to the data providing unit and a second clock signal having a different phase from the first clock signal; and
a signal combination unit for receiving the differential data and the second clock signal and generating a combination signal by combining the differential data and the second clock signal,
wherein the second clock signal is a single clock signal and has n times a symbol period of the differential data (n is an integer of 2 or more), the first clock signal and the second clock signal has a difference in phases of 90 degrees, the second clock signal is combined with the differential data in common, the combination signal is a differential signal and has a cross-point voltage level, the cross-point voltage level varies depending on a level of the second clock signal, and the combination signal is externally transmitted through differential transmission lines.

2. The semiconductor device of claim 1, wherein:
the second clock signal has a period twice the symbol period of the differential data, and
the second clock signal maintains a logic high level or a logic low level while a level of the differential data shifts.

3. The semiconductor device of claim 1, further comprising a delay circuit for receiving the differential data or the second clock signal, delaying the phase of the differential data or the second clock signal, and outputting the delayed differential data or second clock signal in order to compensate for a delay of input to output timing of the first clock signal of the data providing unit.

4. The semiconductor device of claim 1, further comprising a high pass filter for receiving the second clock signal, amplifying a high frequency component of the second clock signal, and providing the amplified clock signal to the signal combination unit.

5. A semiconductor system, comprising:
a first semiconductor device for receiving differential reception signals through differential transmission lines, wherein the first semiconductor device comprises:
a differential equalizer for amplifying high frequency bands of the differential reception signals and outputting the amplified signals as differential signals;
a differential data recovery unit for recovering differential data from the differential reception signals by detecting a difference between the differential signals having the amplified high frequency bands;
a differential clock recovery unit for extracting a common mode signal by adding the differential signals having the amplified high frequency bands, recovering a single clock signal from the differential signals having the amplified high frequency bands, and generating differential clock signals having a specific phase difference from the differential data by converting the recovered single clock signal into the differential clock signals;
a data sampling unit for sampling the differential data using the differential data and the differential clock signals; and
a delay circuit for receiving the differential data or the differential clock signals, delaying the phases of the differential data or differential clock signals, and outputting the delayed differential data or differential clock signals in order to compensate for a delay difference between output timing of the differential data from the differential data recovery unit and output timing of the differential clock signals from the differential clock recovery unit.

6. The semiconductor system of claim 5, wherein a difference in the phases of the differential data and the differential clock signals is 90 degree.

7. The semiconductor system of claim 5, wherein the differential clock recovery unit comprises an amplification circuit for extracting the common mode signal from the differential signals having the amplified high frequency bands and amplifying the extracted common mode signal.

8. The semiconductor system of claim 5, further comprising a voltage-controlled delay line for receiving the differential clock signals from the differential clock recovery unit, controlling the phases of the differential clock signals based on an output phase of the data sampling unit, and outputting the differential clock signals having the controlled phases to the data sampling unit.

9. The semiconductor system of claim 5, wherein the differential clock recovery unit comprises a phase converter for generating a clock signal converted into 4 phases from the generated single clock signal and outputting the clock signal, converted into the 4 phases, to the data sampling unit.

10. The semiconductor system of claim 5, wherein the differential clock recovery unit comprises a frequency divider for generating the clock signal converted into the 4 phases by dividing frequencies of the generated differential clock signals and outputting the clock signal converted into the 4 phases to the data sampling unit.

11. The semiconductor system of claim 5, wherein the differential clock recovery unit comprises a frequency multiplier for generating the differential clock signals having the converted frequencies by multiplexing the frequencies of the generated differential clock signals and outputting the differential clock signals having the converted frequencies to the data sampling unit.

12. The semiconductor system of claim 5, wherein:
the semiconductor system further comprises a second semiconductor device for generating the differential data and outputting the differential data through the differential transmission lines,
the second semiconductor device comprises a data providing unit for providing the differential data; a multi-phase clock generation unit for generating a first clock signal provided to the data providing unit and a second clock signal having a different phase from the first clock signal; and a signal combination unit for receiving the differential data and the second clock signal and generating a combination signal by combining the differential data and the second clock signal, and
the second clock signal is a single clock signal and has n times a symbol period of the differential data (n is an integer of 2 or more), the first clock signal and the second clock signal has a difference in phases of 90 degrees.

13. A semiconductor system, comprising:
a first semiconductor device for receiving differential reception signals through differential transmission lines,
wherein the first semiconductor device comprises:
a differential data recovery unit for recovering differential data from the differential reception signals by detecting a difference between the differential reception signals;
a differential clock recovery unit for extracting a common mode signal by adding the differential reception signals, recovering a single clock signal from the differential reception signals, and generating differential clock signals having a specific phase difference from the differential data by converting the recovered single clock signal into the differential clock signals;
a data sampling unit for sampling the differential data using the differential data and the differential clock signals; and
a delay circuit for receiving the differential data or the differential clock signals, delaying the phases of the differential data or differential clock signals, and outputting the delayed differential data or differential clock signals in order to compensate for a delay difference between output timing of the differential data from the differential data recovery unit and output timing of the differential clock signals from the differential clock recovery unit.

14. The semiconductor system of claim 13, wherein a difference in the phases of the differential data and the differential clock signals is 90 degree.

15. The semiconductor system of claim 13, wherein the differential clock recovery unit comprises an amplification circuit for extracting the common mode signal from the differential reception signals and amplifying the extracted common mode signal.

16. The semiconductor system of claim 15, wherein the differential data recovery unit comprises a differential equalizer that assigns, to the differential data, time delay equal to time delay according to the amplification circuit and that is implemented using a differential equivalent circuit of an amplification circuit in order to amplify a signal of a high frequency band.

17. The semiconductor system of claim 13, further comprising a voltage-controlled delay line for receiving the differential clock signals from the differential clock recovery unit, controlling the phases of the differential clock signals based on an output phase of the data sampling unit, and outputting the differential clock signals having the controlled phases to the data sampling unit.

18. The semiconductor system of claim 13, wherein the differential clock recovery unit comprises a phase converter for generating a clock signal converted into 4 phases from the generated single clock signal and outputting the clock signal, converted into the 4 phases, to the data sampling unit.

19. The semiconductor system of claim 13, wherein the differential clock recovery unit comprises a frequency divider for generating differential clock signals converted into 4 phases by dividing frequencies of the generated differential clock signals and outputting the differential clock signals converted into the 4 phases to the data sampling unit.

20. The semiconductor system of claim 13, wherein the differential clock recovery unit comprises a frequency multiplier for generating the differential clock signals having the converted frequencies by multiplexing the frequencies of the generated differential clock signals and outputting the differential clock signals having the converted frequencies to the data sampling unit.

21. The semiconductor system of claim 13, wherein:
the semiconductor system further comprises a second semiconductor device for generating the differential data and outputting the differential data through the differential transmission lines,
the second semiconductor device comprises a data providing unit for providing the differential data; a multi-phase clock generation unit for generating a first clock signal provided to the data providing unit and a second clock signal having a different phase from the first clock signal; and a signal combination unit for receiving the differential data and the second clock signal and generating a combination signal by combining the differential data and the second clock signal, and
the second clock signal is a single clock signal and has n times a symbol period of the differential data (n is an integer of 2 or more), the first clock signal and the second clock signal has a difference in phases of 90 degrees.

22. A semiconductor system, comprising:
a first semiconductor device for receiving differential reception signals through differential transmission lines,
wherein the first semiconductor device comprises:
a differential equalizer for amplifying high frequency bands of the differential reception signals and outputting the amplified signals as differential signals;
a differential data recovery unit for recovering differential data from the differential reception signals by detecting a difference between the differential signals having the amplified high frequency bands;

a single clock recovery unit for extracting a common mode signal by adding the differential reception signals while sharing some functions of the differential equalizer and recovering a single clock signal from the differential reception signals;

a differential clock recovery unit for generating differential clock signals having a specific phase difference from the differential data by converting the recovered single clock signal into the differential clock signals;

a data sampling unit for sampling the differential data using the differential data and the differential clock signals; and a delay circuit for receiving the differential data or the differential clock signals, delaying the phases of the differential data or differential clock signals, and outputting the delayed differential data or differential clock signals in order to compensate for a delay difference between output timing of the differential data from the differential data recovery unit and output timing of the differential clock signals from the differential clock recovery unit.

23. The semiconductor system of claim 22, wherein a difference in the phases of the differential data and the differential clock signals is 90 degree.

24. The semiconductor system of claim 22, wherein the single clock recovery unit extracts the common mode signal amplified from the addition of the differential reception signals by sharing a high-frequency amplification circuit of the differential equalizer.

25. The semiconductor system of claim 22, further comprising a voltage-controlled delay line for receiving the differential clock signals from the differential clock recovery unit, controlling the phases of the differential clock signals based on an output phase of the data sampling unit, and outputting the differential clock signals having the controlled phases to the data sampling unit.

26. The semiconductor system of claim 22, wherein the differential clock recovery unit comprises a phase converter for generating a clock signal converted into 4 phases from the generated single clock signal and for outputting the clock signal, converted into the 4 phases, to the data sampling unit.

27. The semiconductor system of claim 22, wherein the differential clock recovery unit comprises a frequency divider for generating a clock signal converted into 4 phases by dividing frequencies of the generated differential clock signals and for outputting the clock signal converted into the 4 phases to the data sampling unit.

28. The semiconductor system of claim 22, wherein the differential clock recovery unit comprises a frequency multiplier for generating the differential clock signals having the converted frequencies by multiplexing the frequencies of the generated differential clock signals and outputting the differential clock signals having the converted frequencies to the data sampling unit.

29. The semiconductor system of claim 22, wherein:

the semiconductor system further comprises a second semiconductor device for generating the differential data and outputting the differential data through the differential transmission lines, the second semiconductor device comprises a data providing unit for providing the differential data; a multi-phase clock generation unit for generating a first clock signal provided to the data providing unit and a second clock signal having a different phase from the first clock signal; and a signal combination unit for receiving the differential data and the second clock signal and generating a combination signal by combining the differential data and the second clock signal, and the second clock signal is a single clock signal and has n times a symbol period of the differential data (n is an integer of 2 or more), the first clock signal and the second clock signal has a difference in phases of 90 degrees.

* * * * *